(12) United States Patent
Godinez et al.

(10) Patent No.: US 11,704,383 B2
(45) Date of Patent: Jul. 18, 2023

(54) DYNAMIC GENERATION AND INJECTION OF EDGE-CACHED META-DATA

(71) Applicant: BBY SOLUTIONS, INC., Richfield, MN (US)

(72) Inventors: Sean Godinez, Woodbury, MN (US); Praveen Kotla, Apple Valley, MN (US); David Adolphson, Apple Valley, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 204 days.

(21) Appl. No.: 16/588,853

(22) Filed: Sep. 30, 2019

(65) Prior Publication Data

US 2021/0097115 A1 Apr. 1, 2021

(51) Int. Cl.
*G06F 16/958* (2019.01)
*G06F 12/0802* (2016.01)
*G06F 16/907* (2019.01)

(52) U.S. Cl.
CPC ........ *G06F 16/958* (2019.01); *G06F 12/0802* (2013.01); *G06F 16/907* (2019.01)

(58) Field of Classification Search
CPC ... G06F 16/958; G06F 12/0802; G06F 16/907
See application file for complete search history.

(56) References Cited

U.S. PATENT DOCUMENTS

| | | |
|---|---|---|
| 6,330,592 B1 | 12/2001 | Makuch et al. |
| 7,188,214 B1 | 3/2007 | Kasriel et al. |
| 7,188,216 B1 | 3/2007 | Rajkumar et al. |
| 7,200,681 B1 | 4/2007 | Lewin et al. |
| 8,370,874 B1 | 2/2013 | Chang et al. |
| 10,623,408 B1 | 4/2020 | Marshall et al. |
| 10,867,005 B1 | 12/2020 | Villiers et al. |
| 2002/0065899 A1 | 5/2002 | Smith et al. |
| 2002/0188694 A1 | 12/2002 | Yu |
| 2007/0180099 A1* | 8/2007 | Tsimelzon ............... G06F 9/44 709/223 |
| 2009/0150518 A1 | 6/2009 | Lewin et al. |
| 2010/0274819 A1* | 10/2010 | Lewin ................. H04L 67/2842 707/803 |
| 2012/0303697 A1 | 11/2012 | Alstad |
| 2013/0332814 A1 | 12/2013 | Marlow |

(Continued)

OTHER PUBLICATIONS

"U.S. Appl. No. 16/588,900, Non Final Office Action dated Feb. 26, 2021", 17 pgs.

(Continued)

*Primary Examiner* — Nathan Hillery
(74) *Attorney, Agent, or Firm* — Schwegman, Lundberg & Woessner, P.A.

(57) ABSTRACT

Systems and techniques for dynamic generation and injection of edge-cached meta-data are described herein. A request for a component of a web page requested by a user from a content delivery network may be received. The component may be retrieved from an application server. Instructions may be generated for the component. The instructions may be injected around the component may be wrapped to form a wrapped component. The wrapped component may be transmitted to the content delivery network for storage in an edge cache.

21 Claims, 6 Drawing Sheets

(56) References Cited

U.S. PATENT DOCUMENTS

| | | | |
|---|---|---|---|
| 2014/0181186 A1* | 6/2014 | Stevens | H04L 41/509 709/203 |
| 2015/0180733 A1 | 6/2015 | Krutzler et al. | |
| 2015/0180992 A1 | 6/2015 | Thibeault et al. | |
| 2015/0207897 A1 | 7/2015 | Flack et al. | |
| 2015/0310126 A1* | 10/2015 | Steiner | G06F 16/9577 715/204 |
| 2015/0381756 A1 | 12/2015 | Lotfaliah et al. | |
| 2018/0205782 A1* | 7/2018 | Wei | H04L 67/2847 |
| 2019/0028560 A1* | 1/2019 | Holland | G06F 11/3495 |
| 2019/0222619 A1* | 7/2019 | Shribman | H04N 21/4622 |
| 2020/0151387 A1* | 5/2020 | Choi | G06F 40/197 |
| 2020/0177941 A1 | 6/2020 | El Essaili et al. | |
| 2021/0097127 A1 | 4/2021 | Godinez et al. | |

OTHER PUBLICATIONS

"U.S. Appl. No. 16/588,900, Notice of Allowance dated Aug. 9, 2021", 6 pgs.

"U.S. Appl. No. 16/588,900, Response filed May 26, 2021 to Non Final Office Action dated Feb. 26, 2021", 10 pgs.

"U.S. Appl. No. 16/588,900, 312 Amendment filed Nov. 2, 2021", 9 pgs.

"U.S. Appl. No. 16/588,900, Corrected Notice of Allowability dated Nov. 5, 2021", 3 pgs.

"U.S. Appl. No. 16/588,900, PTO Response to Rule 312 Communication dated Nov. 17, 2021", 2 pgs.

\* cited by examiner

```
ACTION WRAPPER
                                                                                                    ┌── 400
INJECTED ESI DIRECTIVES (METADATA):
<ESI:TEXT>
  <ESI:CHOOSE>
    <ESI:WHEN TEST="'$(CSI_INSTANCES_SHOP_PE_ACTION_TEMPLATE_V1_ID)'|'$(CSI_INSTANCES_SHOP_PE_ACTION_TEMPLATE_V1_ID)'=='">
      <ESI:ASSIGN NAME="CSI_INSTANCES_SHOP_PE_ACTION_TEMPLATE_V1_ID" VALUE="SHOP-APE-ACTION-TEMPLATE-+$RAND()"/>
    </ESI:WHEN>
  </ESI:CHOOSE>
  <ESI:ASSIGN NAME="CSI_INSTANCES_SHOP_COMPLETE_YOUR_PURCHASE_V1_ID" VALUE="SHOP-COMPLETE-YOUR-PURCHASE-+$RAND()"/>
</ESI:TEXT>
INJECTED HTML ACTION/COMPONENT WRAPPER:
<DIV ID="$(CSI_INSTANCES_SHOP_PE_ACTION_TEMPLATE_V1_ID)" DATA-VERSION="1.0.13">

┌─────────────────────────────────────────────────────────────────────
        │                           COMPONENT
        │ INJECTED ESI DIRECTIVES (METADATA):
        │ <ESI:TEXT>
        │   <ESI:CHOOSE>
        │     <ESI:WHEN TEST="'$(CSI_INSTANCES_SHOP_COMPLETE_YOUR_PURCHASE_V1_ID)'|'$(CSI_INSTANCES_SHOP_COMPLETE_YOUR_PURCHASE_V1_ID)'=='">
        │       <ESI:ASSIGN NAME="CSI_INSTANCES_SHOP_COMPLETE_YOUR_PURCHASE_V1_ID" VALUE="SHOP-COMPLETE-YOUR-PURCHASE-+$RAND()"/>
        │     </ESI:WHEN>
        │   </ESI:CHOOSE>
        │ </ESI:TEXT>
        │ HTML AND SCRIPT FROM COMPONENT RENDERER:
        │ <DIV ID="$(CSI_INSTANCES_SHOP_COMPLETE_YOUR_PURCHASE_V1_ID)" DATA-VERSION="5.0.30">
        │ <DIV>HTML</DIV>
        │ <SCRIPT>
        │   INITIALIZER.INITIALIZECOMPONENT("CREATORNAMESPACE":"SHOP","COMPONENTID":"COMPLETE-YOUR-PURCHASE","CONTRACTVERSION":"V1");
        │ $(CSI_INSTANCES_SHOP_COMPLETE_YOUR_PURCHASE_V1_ID),EN-US);
        │ </SCRIPT>
        │ </DIV>
        └─────────────────────────────────────────────────────────────────────

</DIV>
</DIV>
INJECTED SCRIPT (METAFUNCTION):
INITIALIZER.INITIALIZECOMPONENT({"CREATORNAMESPACE":"SHOP","COMPONENTID":"APE-ACTION-TEMPLATE","CONTRACTVERSION":"V1"},
"$(CSI_INSTANCES_SHOP_PE_ACTION_TEMPLATE_V1_ID)",{"ACTIONLIST":[{"TYPE":"APE_DECISION","ARGS":[]},
"$(CSI_PE_DECISION_ID)")},"$(CSI_PE_TRIAL_ID)"),"$(CSI_PE_ACTION_ID)"),
"$(CSI_INSTANCES_COMPLETE_YOUR_PURCHASE_V1_ID)"}],{"TYPE":"COMPONENT_VISIBLE","ARGS":[]},"OVERRIDEINSTANCEID":",
"(CSI_INSTANCES_SHOP_COMPLETE_YOUR_PURCHASE_V1_ID)"}]},'EN-US');
```

*FIG. 4*

DYNAMIC GENERATION AND INJECTION OF EDGE-CACHED META-DATA

TECHNICAL FIELD

Embodiments described herein generally relate to web content caching and, in some embodiments, more specifically to dynamic generation and injection of content delivery network meta-data and meta-function behaviors within a webpage.

BACKGROUND

It may be beneficial to serve web pages to users as fast as possible. Having an entire web page (or a large percentage of the web page) served directly to the user from a content delivery network (CDN) may decrease the time it takes to deliver a web page to the user. Additionally, serving content directly from the CDN may be less costly, because less traffic traverses the internet to reach backend application servers. While existing approaches may enable serving web site traffic from a CDN, however, these approaches fail to provide efficient caching of dynamic content.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4 illustrates an example of a wrapper injection for dynamic generation and injection of edge-cached meta-data, according to an embodiment.

DETAILED DESCRIPTION

Figure 1:
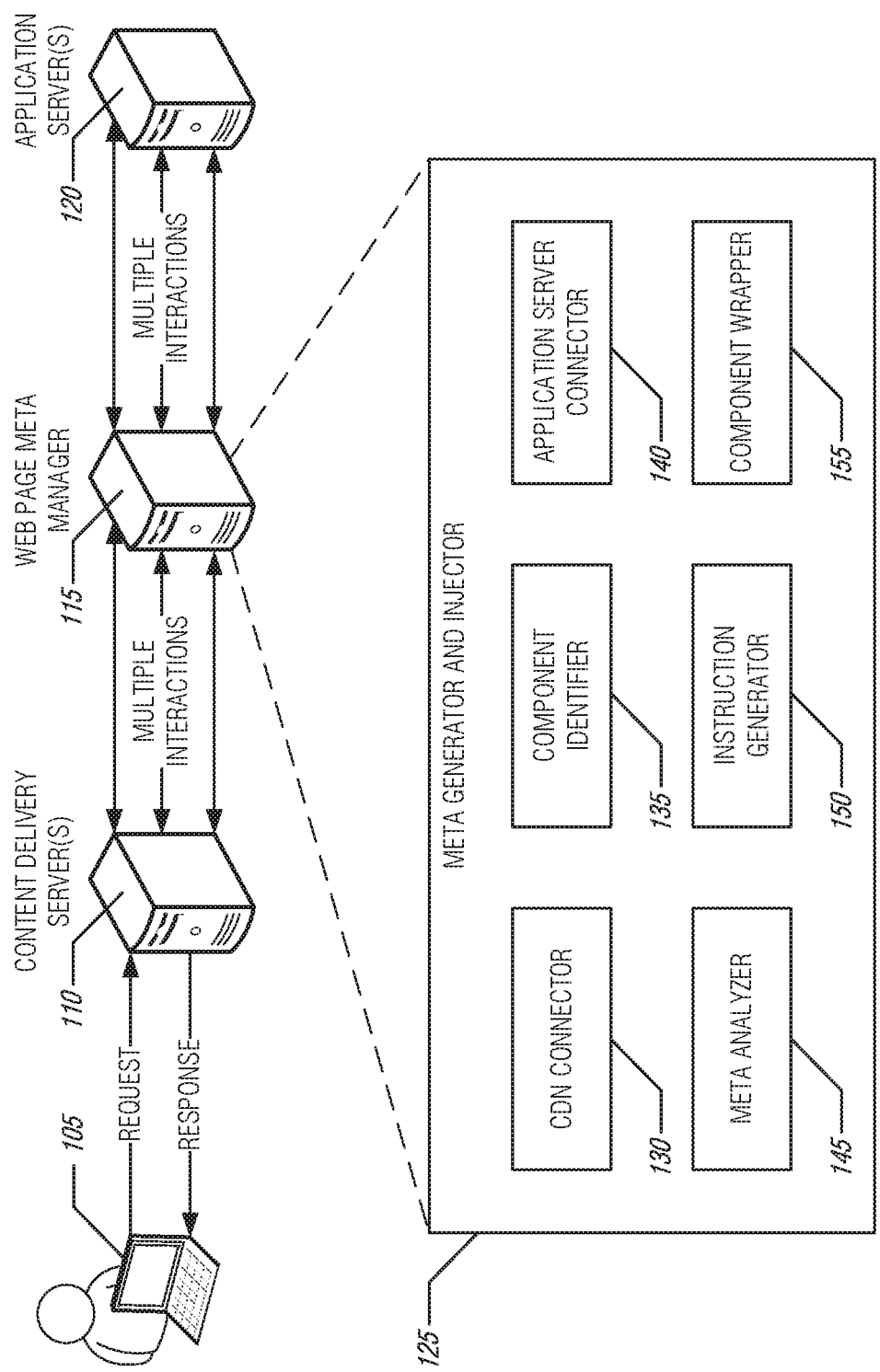
FIG. 1 is a block diagram of an example of an environment and system for dynamic generation and injection of edge-cached meta-data, according to an embodiment.

Serving web pages from a CDN may increase the speed with which a page is delivered to a user. The CDN may have a variety of edge caches that hold page content that is used to render a page. Conventional edge caching solutions may enable serving web site traffic from a CDN, however, they may not be able to efficiently cache and serve dynamic content because the content may change resulting in frequent cache updates. The systems and techniques discussed herein provide a number of unique benefits that allow enhanced cacheability of content.

A CDN provides edge caching and the ability to execute edge-side include (ESI) logic at the edge. A personalization engine is a system that assigns dynamic components to each recognized user. While the examples provided use a personalization engine to demonstrate the features of the systems and techniques discussed herein, it may be understood that these features may increase caching efficiency and effectiveness in a variety of other scenarios where dynamic view components are utilized. Component rendering systems provide rendered hypertext markup language (HTML) for fragments of a web page. A page assembly system is an application which provides a way to stitch together pages of components, integrate with a personalization engine, integrate with component rendering systems, and other related functions.

When independent view components (e.g., fragments of a web page that are independently rendered) are placed multiple times on a single page. JAVASCRIPT® for each component needs to know where to bind within the document object model (DOM) of the page. This binding requires a unique ID with a <div> tag on the page and the same unique ID within a <script> tag on the page for each placement of a view component. The systems and techniques discussed herein allow this unique ID to be generated in a controlled fashion (e.g., not random) at the CDN which allows this binding to happen without negatively impacting the ability for these view components to be cached at the CDN.

The same unique ID that is generated at the CDN allows view components to react in a conditional fashion to events being fired by other view components on the page within the web browser. In conventional edge caching solutions, the components must all react to all events of all event types that are relevant to that component, rather than conditionally react to only events from specific sources. An example of this capability would be allowing different behaviors to be triggered by clicks on any of multiple "add to cart button" view components placed on an e-commerce product detail page. Each of these buttons is the "same component" from a CDN cache perspective, but the systems and techniques discussed herein allow the events that each component fires on-click to cause different behavior. This provides the ability to construct relationships between view components in the browser or other client device without impacting the ability or efficiency of caching these view components at the CDN.

When a feedback loop is required to enable machine learning based on a user viewing or interacting with a view component on a page, conditional (and sometimes decision-specific) meta-data and meta-functions are required around these components. The systems and techniques discussed herein enable conditional meta-data and meta-functions without negatively impacting the ability for the CDN to cache the view components. This feature is beneficial when a personalization engine is making noncached (or cached) decisions regarding which view components to place on the page. In contrast, in conventional edge caching solutions any view component impacted by a decision of a personalization engine (e.g., being placed by the personalization engine) and requiring a real-time machine learning feedback loop would be unable to be cached at the CDN.

Whenever conditionally injected styling around a view component (e.g., borders, padding, etc.) is required, the systems and techniques discussed herein may enable the component to be wrapped with instructions to facilitate styling in a manner that does not impact the cacheability of the component. Borders and padding are often required to be conditional if the component (or a neighboring component)

renders nothing (e.g., intentionally, due to error when rendering, etc.) so that the user doesn't see two borders with no content between them.

When the functions described above are needed on a web page, conventional edge caching solutions lose the ability to efficiently cache the render of the view component at the CDN because they do not decouple the wrapper from the view component render itself with the CDN cache. This causes some or all of the following problems: (1) The web page with these functions renders slower to the end user because less of it is cached. (2) The web page populates the CDN cache with more data (e.g., more variations of each view component, etc.). This is not only less efficient on retrieval but also fills up finite cache keys space within the CDN which causes other cached entities to be evicted earlier than they otherwise would be. This may potentially make web pages slower to serve and render to users. (3) Less efficient CDN caching increases the cost of operating the render applications and applications they depend upon to render.

To solve these shortcomings with conventional edge caching solutions, the systems and techniques discussed herein provide the capability of dynamically injecting meta-data and meta-functions (e.g., executable code, etc.) around view components on a web page independently from the view components themselves. One example of this capability is establishing a relationship between an embedded parent and child components within a single page in an CDN cache-efficient manner.

To facilitate dynamically wrapping the view components in meta-data and meta-functions, data is received that describes the meta-data and meta-functions that need to be wrapped around components on a page or some components on a page. Conditions may be received that may indicate variables for wrapping or triggering a view component. ESI directives are generated to support the component wrapping and conditions that will execute in the CDN at an appropriate scope.

A request is received from the CDN for components to be rendered with the appropriate wrapper. The component render is delegated, and the appropriate wrapper is placed around the rendered component. The wrapper contains the necessary ESI directives to support both conditional and global meta-data and meta-functions to be placed. The conditional items are executed at the CDN so that the ability for the CDN to cache the response that contains the rendered component is unaffected.

The systems and techniques discussed herein may work with any CDN that supports the world wide web consortium (W3C) edge-side include (ESI) standards specification and may leverage and build upon other CDN caching optimizations (e.g., other forms of includes, post-processing, etc.).

FIG. 1 is a block diagram of an example of an environment 100 and system 125 for dynamic generation and injection of edge-cached meta-data, according to an embodiment. The environment 100 may include a user computing device 105 that requests a web page to be delivered from content delivery network (CDN) server(s) 110. The CDN server(s) 110 may be communicatively coupled (e.g., via a wired network, wireless network, the internet, cellular network, etc.) to a web page meta manager 115. The web page meta manager 115 may be a computing device (e.g., a stand-alone computer, a server, a virtual server, a cloud computing platform, etc.). In an example, the web page meta manager 115 may be implemented in software stored in computer-readable memory and executed by a computing device, a field programmable gate array (FPGA), an application-specific integrated circuit (ASIC), etc.

The web page meta manager 115 may be communicatively coupled to one or more application server(s) 120. In an example, the application server(s) 120 may include a personalization engine, a page assembly application, and a content rendering system, each implemented with executable instructions, code, or logic on the application server(s) 120.

The web page meta manager 115 may include a system 125. In an example, the system 125 may be a meta generator and injector. The system 125 may include a variety of components including a CDN connector 130, a component identifier 135, an application server connector 140, a meta analyzer 145, an instruction generator 150, and a component wrapper 155, each implemented with executable instructions, code, or logic on the system 125 and web page meta manager 115.

The CDN connector 130 may provide connectivity between the CDN server(s) 110 and the web page meta manager 115. A request for a component of a web page may be received as the result of a user requesting a web page from the CDN server(s) 110. For example, a user may use an internet browser to request the page by entering www.exampleurl.com/shopping into an address bar of the web browser using the user computing device 105. The CDN server(s) 110 may receive the request for the page and transmit the request to the CDN connector 130. In an example, the request for the component may be received via a page assembly application included in the application server(s) 120.

The component identifier 135 may identify the component to be retrieved. For example, an add to cart component may be identified as being placed on the requested web page. The application server connector 140 may provide connectivity between the application server(s) 120 and the web page meta manager 115. The application server connector 140 may retrieve the component from the application server(s) 120. In an example, the component is retrieved from a content rendering system included in the application server(s) 120.

The meta analyzer 145 may identify meta information about the component received from the application server(s) 120 (e.g., a page assembly application, etc.). The meta information may include meta information such as tracking data, function data, variable data, and the like. The instruction generator 150 may generate instructions for the component. In an example, the instructions may be edge-side include instructions generated using the meta information. In an example, the meta analyzer 145 may identify a meta-function included in the meta information and the instruction generator 150 may generate code for the meta-function.

Figure 3:
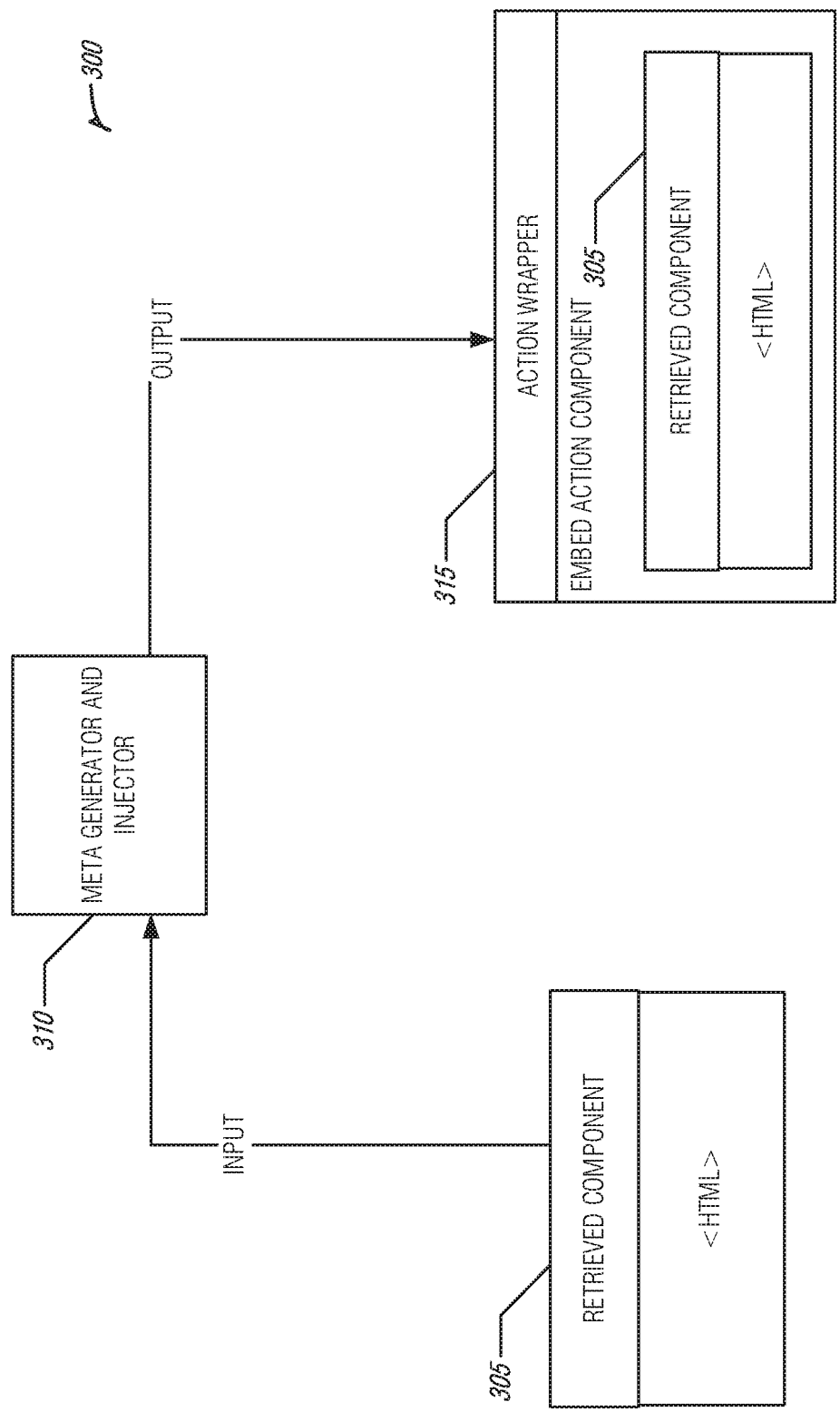
FIG. 3 illustrates a block diagram of an example of component transformation for dynamic generation and injection of edge-cached meta-data, according to an embodiment.

The component wrapper 155 may inject the instructions around the component to form a wrapped component. The instructions may be injected above and below the component depending on the meta information to be injected. In an example, the code generated for the meta-function may be injected into the wrapped component. In an example, the instructions may include an instruction element provided from tracking meta-data, a meta-function, an edge-side callback instruction, or an edge-side include instruction. The instructions in the wrapped component provide instructions for the CDN server(s) 110 to determine variables and conditions, track component information, perform functions, and other executive operations that may be completed when (or before) a page is rendered. This maintains the cacheability of the component by allowing personalization and other dynamic content uses to be performed at page rendering in the CDN without changing the component code for each request, by way of example and not limitation, the instructions may allow the CDN server(s) 110 to determine a variable for a component at page delivery, perform component tracking (e.g., usage tracking, execution quality performance, error tracking, etc.), etc. An example of transformation of a component to a wrapped component is shown in FIG. 3 and a detailed view of a wrapped component is shown in FIG. 4.

The wrapped component is transmitted to the CDN server(s) 110 for storage in an edge cache. In an example, the wrapped component may be transmitted to the CDN server(s) 110 by a page assembly application included in the application server(s).

Figure 2:
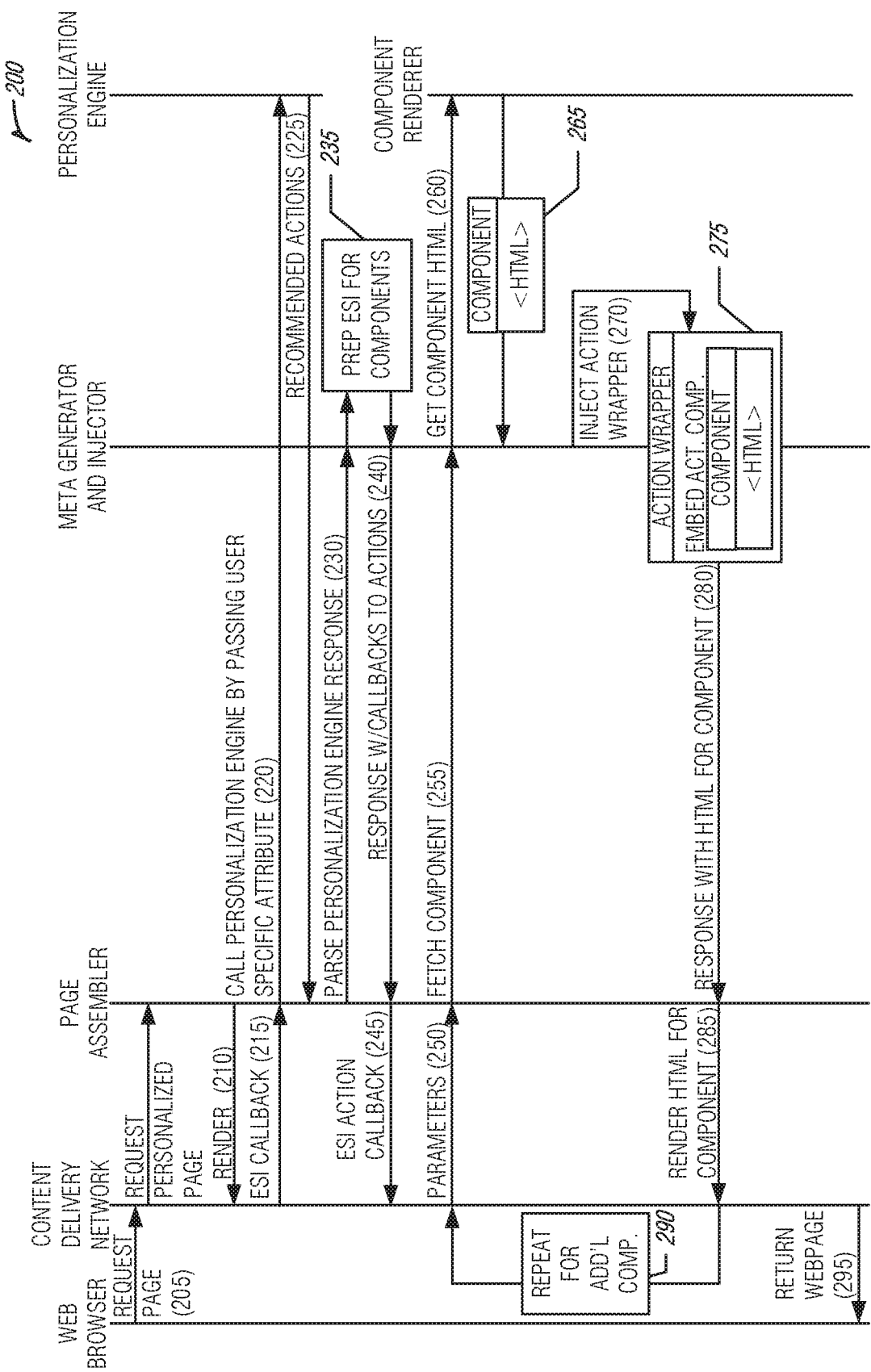
FIG. 2 illustrates a swim lane diagram of an example of a process for dynamic generation and injection of edge-cached meta-data, according to an embodiment.

FIG. 2 illustrates a swim lane diagram of an example of a process 200 for dynamic generation and injection of edge-cached meta-data, according to an embodiment. The process 200 may provide features as described in FIG. 1.

The user makes a request for a webpage (e.g., at operation 205). The page assembly application creates ESI callbacks for personalization decisions (e.g., at operation 210). The page assembly application receives these callbacks and for each (e.g., at operation 215) and calls the personalization engine (e.g., at operation 220) to retrieve actions (e.g., at operation 225) that represent components to place on the web page that need special tracking.

The page assembly application calls the meta generator and injector (e.g., at operation 230) with information about these actions/components so that the meta generator and injector may build ESI directives (e.g., at operation 235) to store meta-data and meta-functions in ESI variables in the CDN. These variables are referenced by the wrappers the meta generator and injector will provide for each action/component. The meta generator and injector returns the ESI directives (e.g., at operation 240) (via Page Assembly application (e.g., at operation 245)) and callbacks for each action/component to the CDN.

The CDN calls the meta generator and injector (e.g., at operation 250) (via the Page Assembly application (e.g., at operation 255)). The meta generator and injector then calls the component rendering system (e.g., at operation 260) to retrieve HTML (e.g., at operation 265). The meta generator and injector wraps this HTML (e.g., at operation 270) with the necessary custom ESI variable references that contains the tracking meta-data and meta-functions in a wrapper around (both before and after) the component HTML (e.g., at operation 275). The combination of HTML and ESI directives are returned to the CDN (e.g., at operation 280) (via the page assembly application (e.g., at operation 285)). The process 200 repeats at operation 250 for each component with a wrapper (e.g., at operation 290). The web page is then returned to the user (e.g., at operation 295).

FIG. 3 illustrates a block diagram of an example of component transformation 300 for dynamic generation and injection of edge-cached meta-data, according to an embodiment. The component transformation 300 may provide features as described in FIGS. 1 and 2.

When a user requests a web page, a component may need to be returned to render the page. In an example, the component may have conditions or personalization variables that may need to be included with the component for proper rendering. To effectively cache the component so that conditions and variables make be determined at rendering, the component is wrapped in instructions (ESI instructions, etc.) that may be used to determine conditions and variables at rendering.

A component 305 may be retrieved that is to be placed on a requested web page. A meta generator and injector 310 receives the component as input (e.g., the HTML code, etc.). The meta generator and injector 310 generates instructions that may be used to make determinations regarding component rendering by a CDN. The meta generator and injector wraps the component 305 with the instructions to form a wrapped component 315. The wrapped component 315 is then sent to the CDN to be included in the edge cache. An example of a wrapped component 315 is shown in FIG. 4.

FIG. 4 illustrates an example of a wrapper injection 400 for dynamic generation and injection of edge-cached meta-data, according to an embodiment. The wrapper injection 400 may provide features as described in FIG. 1-3.

In the example wrapper injection 400 some of the ESI variables referenced are created to allow for placement of the wrapper around the component whenever the component is placed on a page (rather than conditionally). If the variables are created and in scope due to a personalization engine interaction, then the components placed by the personalization engine are wrapped with the necessary meta-data and meta-functions to enable machine learning by the personalization engine. If the same component is placed manually on the page, the variables will not be in scope and the same wrapper will not place the personalization engine-specific meta-data and meta-functions.

However, other meta-data and meta-functions may be needed for each component placement. The ESI variables are defined at a global (e.g., entire page, etc.) scope so that each wrapper execution places the variables around any component on the page. Because the ESI wrapper is not conditionally placed (e.g., because it is always placed), the ability to efficiently cache the component in the CDN is not negatively impacted.

Figure 5:
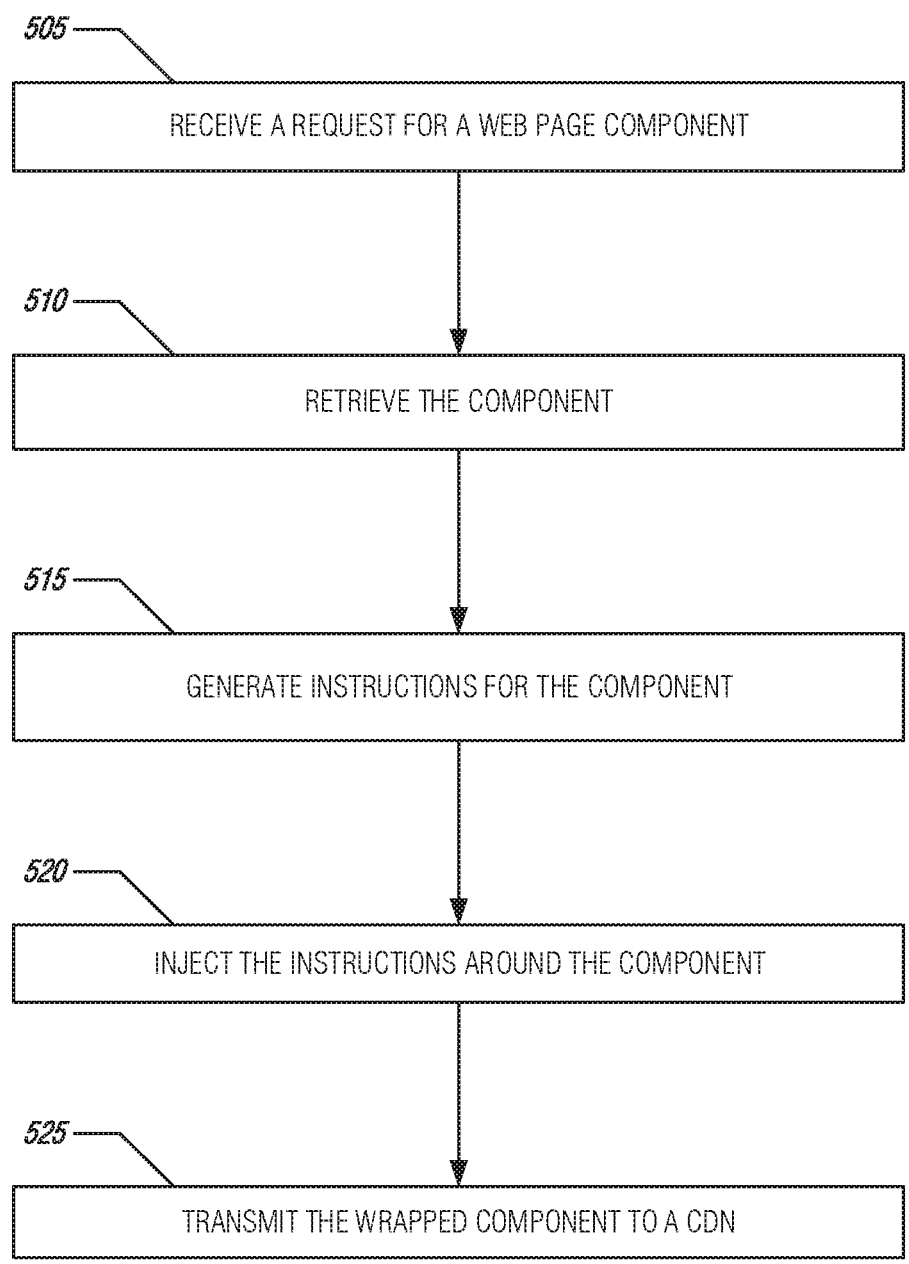
FIG. 5 illustrates a flow diagram of an example of a method for dynamic generation and injection of edge-cached meta-data, according to an embodiment.

FIG. 5 illustrates a flow diagram of an example of a method 500 for dynamic generation and injection of edge-cached meta-data, according to an embodiment. The method 500 may provide features as described in FIGS. 1-4.

A request for a component of a web page requested by a user from a content delivery network may be received (e.g., by the CDN connector 130 as described in FIG. 1, etc.) (at operation 505). In an example, the request for the component may be received via a page assembly application. In an example, meta information about the component may be received.

The component may be retrieved (e.g., by the application connector 140 as described in FIG. 1, etc.) from an application server (e.g., at operation 510). In an example, the application server may be a content rendering system.

Instruction may be generated (e.g., by the instruction generator 150 as described in FIG. 1, etc.) for the component (e.g., at operation 515). In an example, meta information about the component may be received and the instructions may be generated as edge-side include instructions using the meta information. In an example, a meta-function may be identified in the meta information and code for the meta-function may be generated. In an example, the instructions may include an instruction element provided from: of tracking meta-data, a meta-function, an edge-side callback instruction, or an edge-side include instruction.

The instructions may be injected around he component (e.g., by the component wrapper 155 as described in FIG. 1, etc.) to form a wrapped component (e.g., at operation 520). In an example, the code for the meta-function may be injected during component wrapping.

The wrapped component may be transmitted (e.g., by the CDN connector 130 as described in FIG. 1, etc.) to the CDN for storage in an edge cache (e.g., at operation 525). In an example, the wrapped component may be transmitted to the CDN via a page assembly application.

Figure 6:
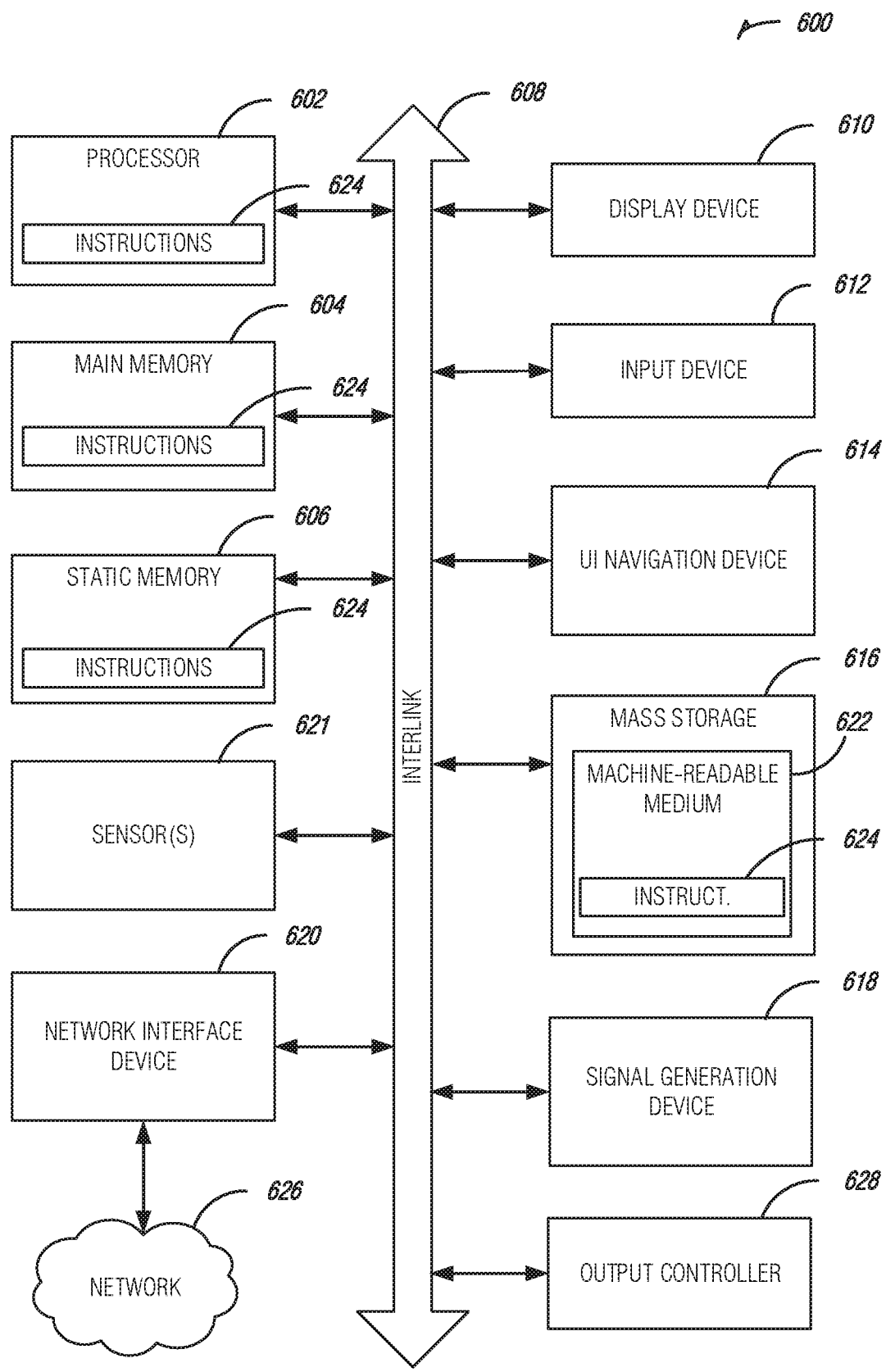
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensors. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM). Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, etc.), IEEE 802.15.4 family of standards, peer-to-peer (P2P) networks. $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL NOTES

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for meta generation and injection for component caching, the system comprising:
    at least one processor; and
    memory comprising executable instructions that, when executed by the at least one processor, cause the at least one processor to perform operations to:
        receive a request for a component of a web page requested by a user, via a user device, from a content delivery network (CDN), wherein the component is an independent fragment of the web page with parameters decoupled from the web page;
        retrieve the component from an application server;
        generate CDN instructions for the component, wherein the CDN instructions are derived from personalization variables and conditional logic for generating a personalized version of the web page, wherein the CDN instructions include instructions executable at a current level of the web page and instructions executable at a parent level of the web page to dynamically generate actions:
        inject the CDN instructions for an action wrapper around the component to form a wrapped component, wherein the action wrapper of the CDN instructions is derived from the personalization variables and conditional logic, and wherein the action wrapper includes instructions that are executable by the CDN to dynamically generate component actions for the component that are abstracted from content cached at the CDN before transmitting the web page to the user device for rendering; and
        transmit the wrapped component to the CDN for storage in an edge cache of the CDN, wherein upon receipt of a request for the component in a web request, the CDN evaluates the action wrapper of the wrapped component from the edge cache to natively render a composed web page for delivery to the user device using metadata representing unique configurations generated by the application server that is evaluated at runtime to serve personalized content and associations between the component and another component.

2. The system of claim 1, wherein the request for the component is received via a page assembly application.

3. The system of claim 1, wherein the application server is a content rendering system.

4. The system of claim 1, the memory further comprising executable instructions that cause the at least one processor to:
    receive meta information about the component, wherein the executable instructions to generate CDN instructions for the component include executable instructions to generate the CDN instructions as edge-side include instructions using the meta information.

5. The system of claim 4, the memory further comprising executable instructions that cause the at least one processor to:

identify a meta-function included in the meta information; and generate code for the meta-function, wherein the executable instructions to inject the CDN instructions around the component includes executable instructions to inject the code for the meta-function into the wrapped component.

6. The system of claim 1, wherein the wrapped component is transmitted to the content delivery network via a page assembly application.

7. The system of claim 1, wherein the CDN instructions for the component include a CDN instruction element selected from the group consisting of tracking meta-data, a meta-function, an edge-side callback instruction, and an edge-side include instruction.

8. At least one non-transitory machine-readable medium comprising executable instructions for meta generation and injection for component caching that, when executed by at least one processor of a computing system, cause the at least one processor to perform operations to:
- receive a request for a component of a web page requested by a user, via a user device, from a content delivery network (CDN), wherein the component is an independent fragment of the web page with parameters decoupled from the web page;
- retrieve the component from an application server;
- generate CDN instructions for the component, wherein the CDN instructions are derived from personalization variables and conditional logic for generating a personalized version of the web page, wherein the CDN instructions include instructions executable at a current level of the web page and instructions executable at a parent level of the web page to dynamically generate actions;
- inject the CDN instructions for an action wrapper around the component to form a wrapped component, wherein the action wrapper of the CDN instructions is derived from the personalization variables and conditional logic, and wherein the action wrapper includes instructions that are executable by the CDN to dynamically generate component actions for the component that are abstracted from content cached at the CDN before transmitting the web page to the user device for rendering; and
- transmit the wrapped component to the CDN for storage in an edge cache of the CDN, wherein upon receipt of a request for the component in a web request, the CDN evaluates the action wrapper of the wrapped component from the edge cache to natively render a composed web page for delivery to the user device using metadata representing unique configurations generated by the application server that is evaluated at runtime to serve personalized content and associations between the component and another component.

9. The at least one non-transitory machine-readable medium of claim 8, wherein the request for the component is received via a page assembly application.

10. The at least one non-transitory machine-readable medium of claim 8, wherein the application server is a content rendering system.

11. The at least one non-transitory machine-readable medium of claim 8, further comprising executable instructions that cause the at least one processor to:
- receive meta information about the component, wherein the executable instructions to generate CDN instructions for the component include executable instructions to generate the CDN instructions as edge-side include instructions using the meta information.

12. The at least one non-transitory machine-readable medium of claim 11, further comprising executable instructions that cause the at least one processor to:
- identify a meta-function included in the meta information; and
- generate code for the meta-function; wherein the executable instructions to inject the CDN instructions around the component includes executable instructions to inject the code for the meta-function into the wrapped component.

13. The at least one non-transitory machine-readable medium of claim 8, wherein the wrapped component is transmitted to the content delivery network via a page assembly application.

14. The at least one non-transitory machine-readable medium of claim 8, wherein the CDN instructions for the component include a CDN instruction element which includes:
- tracking meta-data, a meta-function, an edge-side callback instruction, or an edge-side include instruction.

15. A method for meta generation and injection for component caching, the method comprising:
- receiving a request for a component of a web page requested by a user, via a user device, from a content delivery network (CDN), wherein the component is an independent fragment of the web page with parameters decoupled from the web page;
- retrieving the component from an application server;
- generating CDN instructions for the component, wherein the CDN instructions are derived from personalization variables and conditional logic for generating a personalized version of the web page, wherein the CDN instructions include instructions executable at a current level of the web page and instructions executable at a parent level of the web page to dynamically generate actions:
- injecting the CDN instructions for an action wrapper around the component to form a wrapped component, wherein the action wrapper of the CDN instructions is derived from the personalization variables and conditional logic, and wherein the action wrapper includes instructions that are executable by the CDN to dynamically generate component actions for the component that are abstracted from content cached at the CDN before transmitting the web page to the user device for rendering; and
- transmitting the wrapped component to the CDN for storage in an edge cache of the CDN, wherein upon receipt of a request for the component in a web request, the CDN evaluates the action wrapper of the wrapped component from the edge cache to natively render a composed web page for delivery to the user device using metadata representing unique configurations generated by an application server that is evaluated at runtime to serve personalized content and associations between the component and another component.

16. The method of claim 15, wherein the request for the component is received via a page assembly application.

17. The method of claim 15, wherein the application server is a content rendering system.

18. The method of claim 15, further comprising:
- receiving meta information about the component, wherein the CDN instructions are generated as edge-side include instructions using the meta information.

19. The method of claim 18, further comprising:
identifying a meta-function included in the meta information; and
generating code for the meta-function, wherein injecting the CDN instructions around the component includes injecting the code for the meta-function into the wrapped component.

20. The method of claim 15, wherein the wrapped component is transmitted to the content delivery network via a page assembly application.

21. The method of claim 15, wherein the CDN instructions include a CDN instruction element which includes:
tracking meta-data, a meta-function, an edge-side callback instruction, or an edge-side include instruction.

* * * * *